US006827266B2

(12) United States Patent
Mergenthaler et al.

(10) Patent No.: US 6,827,266 B2
(45) Date of Patent: Dec. 7, 2004

(54) METHODS AND APPARATUS FOR USING IMAGING INFORMATION TO IMPROVE SCANNING ACCURACY IN BAR CODE SCANNERS

(75) Inventors: Barry M. Mergenthaler, Lawrenceville, GA (US); Paul Oliver Detwiler, Lawrenceville, GA (US); John Kenneth Burkey, Duluth, GA (US); Yeming Gu, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/264,798

(22) Filed: Oct. 4, 2002

(65) Prior Publication Data

US 2004/0065740 A1 Apr. 8, 2004

(51) Int. Cl.[7] ................................................. G06K 7/10
(52) U.S. Cl. ........................... 235/462.14; 235/462.01; 235/462.08; 235/462.1; 235/462.16; 235/462.25
(58) Field of Search ................................. 235/383, 384, 235/385, 462.01, 462.08, 462.15, 462.32, 462.41, 462.1, 462.16, 462.25

(56) References Cited

U.S. PATENT DOCUMENTS

| | | | | |
|---|---|---|---|---|
| 5,340,970 A | * | 8/1994 | Wolfe, Jr. et al. ........... 235/383 |
| 5,756,981 A | * | 5/1998 | Roustaei et al. ........ 235/462.01 |
| 6,069,696 A | * | 5/2000 | McQueen et al. ........... 356/326 |
| 6,336,587 B1 | * | 1/2002 | He et al. ................ 235/462.45 |
| 6,424,745 B1 | * | 7/2002 | Hansen et al. .............. 382/191 |
| 6,434,257 B1 | * | 8/2002 | Mohan et al. ............... 382/110 |
| 6,592,033 B2 | * | 7/2003 | Jennings et al. ............. 235/385 |
| 6,598,791 B2 | * | 7/2003 | Bellis et al. ................. 235/383 |

* cited by examiner

Primary Examiner—Michael G. Lee
Assistant Examiner—Ahshik Kim
(74) Attorney, Agent, or Firm—Priest & Goldstein, PLLC; Paul W. Martin

(57) ABSTRACT

Techniques for using imaging information computed from examining a scanner signal are described. When one or more objects passes within a field of view of a scanner, scan patterns emerging from one or more scanner windows and reflected from the objects back into the scanner windows produce one or more scanner signals. The scanner signals are processed to obtain beam position and beam length information to improve the accuracy of bar code decoding and to compute imaging information for objects within the field of view of the scanner. The imaging information for the objects is compared with bar code information for the objects. The expected number, size and shapes of objects indicated by the bar code information is compared with the actual number, size and shapes of objects in order to determine if valid scans occurred or if missed, double or otherwise erroneous scans occurred.

14 Claims, 7 Drawing Sheets

METHODS AND APPARATUS FOR USING IMAGING INFORMATION TO IMPROVE SCANNING ACCURACY IN BAR CODE SCANNERS

FIELD OF THE INVENTION

The present invention relates generally to improvements to bar code scanners and bar code scanning. More particularly, the invention relates to advantageous techniques for interpreting a scanner signal to obtain information about the size, shape, position and motion of an object in the scan field of the scanner and using this information to improve the accuracy of decoding of a bar code on the object.

BACKGROUND OF THE INVENTION

Bar code scanners are used in a wide variety of applications, such as retailing, inventory control, customer identification and many other applications. Many bar code scanners are adapted to scan a bar code located on an object, when the object is placed within the field of view of the scanner. Many such scanners produce complex scan patterns in order to maximize coverage of an object, so that a bar code located on an object will produce a readable reflection, even if the bar code is located on a relatively obscure area of an irregularly shaped object.

Frequently, especially in retail settings, it is highly desirable to scan objects in a rapid fashion, with objects being scanned one after another at a rate of more than one object every two seconds. At times during the scanning of a succession of objects, the scanning of some of the objects may be impaired for any of a number of reasons. For example, missed scans may occur due to a failure of an operator to bring the bar code into the field of view of the scanner. Double scans may result from the scanning of the same bar code by different scan lines. A scan of a bar code may fail because of low legibility resulting, for example, from low contrast of the bar code or damage to the bar code. Incorrect placement of a bar code on an object may result in an incorrect identification of the product being entered into the transaction.

SUMMARY OF THE INVENTION

Among its several aspects, the present invention recognizes that many such difficulties maybe overcome if imaging information about the objects brought into the field of view of a scanner can be obtained and is properly used in conjunction with the decoding of bar codes on the objects. The signal produced by scanning an object can, if properly interpreted, provide information not only about the bar code on the object but also about the object itself. Techniques for interpreting a scanner signal to obtain imaging information about an object are described on "Methods and Apparatus for Obtaining Imaging Information in Bar Code Scanners, U.S. Pat. application Ser. No. 10/264,758, filed on even date herewith and having a common assignee to the present invention and incorporated herein by reference in its entirety.

According to one aspect, the present invention provides advantageous techniques for interpreting a scanner signal produced when one or more objects are brought into a field of view of a scanner to produce imaging information about the objects. This imaging information is then used to improve the accuracy of decoding bar codes located on or associated with the objects. A bar code scanner according to one aspect of the present invention may suitably comprise a scanning laser beam typically reflected from a rotating mirror to produce a scan pattern emerging from one or more scan windows to strike an object placed in or moving through the field of view of the scanner. The scan pattern typically comprises a number of scan lines, with each scan line being a trace of the scanning laser beam. Upon striking the object, a portion of the light reflected from the scan pattern is reflected back into the scanner where it is collected and used to produce a scan signal. The scan signal typically includes low frequency and DC components resulting from diffusively reflected light from the surface of the object. If the scan pattern strikes a bar code on the object, the scan signal will typically also include high frequency components resulting from the reflections from the bar code.

The signal is conditioned and split in order to provide a signal to a bar code module used to decode and interpret any bar codes within the field of view of the scanner, and to provide another, identical signal, to a time and space module used to extract timing information from the scan signal and to interpret the timing information in order to provide spatial information about the object in the field of view of the scanner. Details of the operation of a presently preferred time and space module are provided in the U.S. application Ser. No. 10/264,758 referred to above.

The bar code module may suitably provide timing information to the time and space module. The timing information indicates when a bar code is detected, and this timing information can be used by the time and space module to estimate imaging information about the object or objects in the field of view of the scanner when the bar code is detected. This information may include the size, shape, position and direction of travel of the object or objects. The time and space module transfers the imaging information to the bar code module, which then uses the imaging information to assist in decoding the bar code or bar codes. For example, the imaging information may indicate that there are two objects each of which has its own bar code label within the field of view of the scanner at a time at which two bar codes are detected. This information can be used to establish that a double scan of a single bar code has not occurred and to allow for proper decoding of both bar codes. Conversely, the imaging information may indicate that there are two objects within the field of view of the scanner at a time when only one bar code is detected, allowing a determination and notification of a missed scan.

Other uses of the imaging information may advantageously include determining if the approximate size of a an object is consistent with the product identified by the bar code associated with the object, or using distance information to determine the approximate width of the scan beam when it strikes the bar code, to aid in decoding the bar code.

A more complete understanding of the present invention, as well as further features and advantages of the invention, will be apparent from the following Detailed Description and the accompanying drawings.

DETAILED DESCRIPTION

Figure 1:
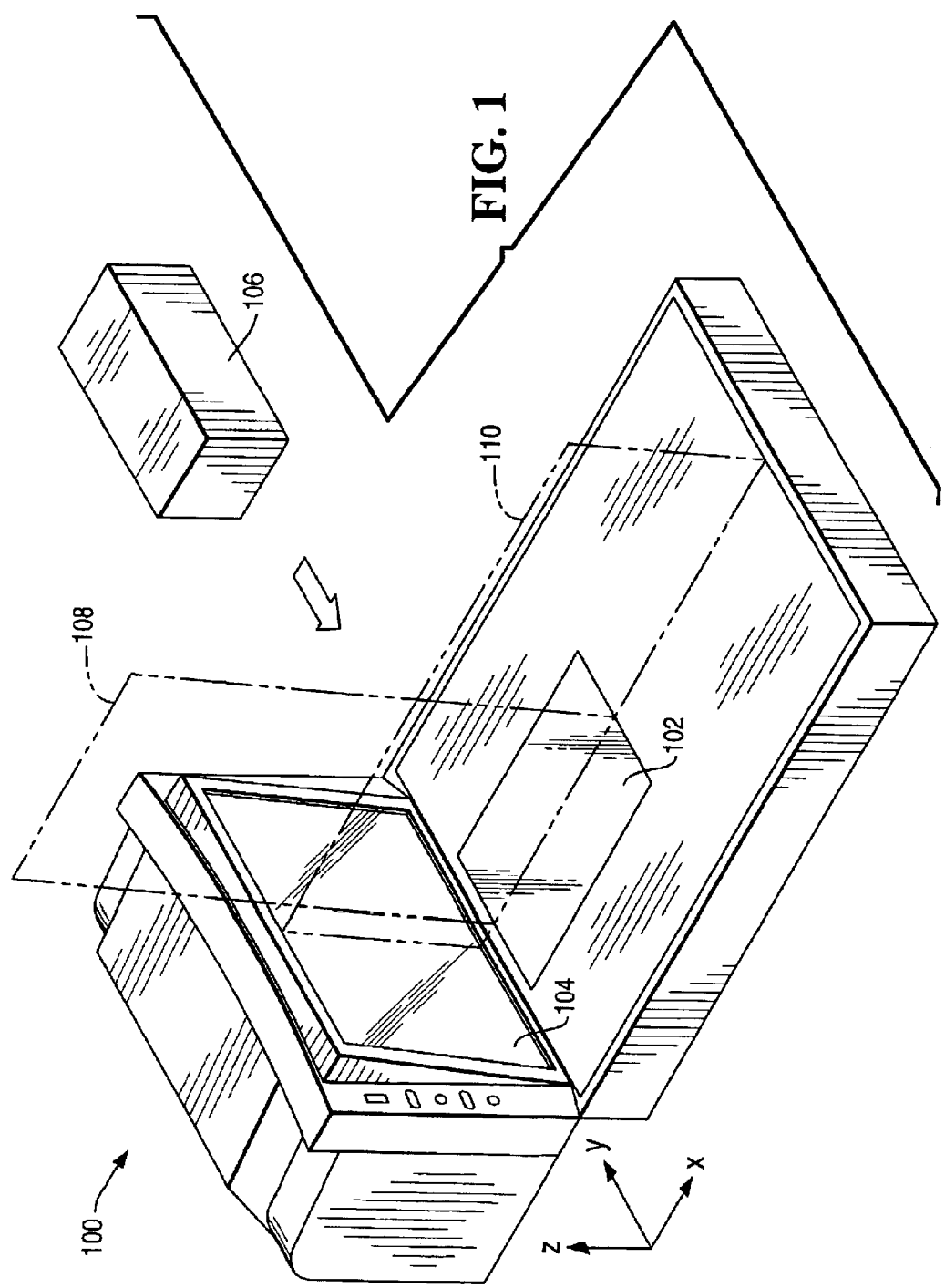
FIG. 1 illustrates a multiple window scanner capable of generating and using imaging information in accordance with the present invention.

FIG. 1 illustrates a scanner 100 having a horizontal scan window 102 and a vertical scan window 104, according to the present invention. The scanner 100 generates a scanner signal based on light reflected from an object passing within the field of view of one or both of the windows 102 and 104. In FIG. 1, the example of a box 106 being passed within range of the scan windows 102 and 104 is illustrated. In this illustration, the box 106 passes through a first scan plane 108 emitted from the horizontal scan window 102 and a second scan plane 110 emitted from the vertical scan window 104. Each of the scan planes 108 and 110 is produced by the tracing of a scan beam along a path determined by the rotation of a spinner within the scanner 100. As the box 106 passes within the field of view of the scanner windows 102 and 104, the box 106 intersects the scan planes 108 and 110, the box 106 simultaneously intersects both of the scan planes 102 and 104. During the time that the box 106 is intersecting the scan planes 108 and 110, light is being reflected back into the scanner 100.

Timing information relating to the times at which the light reflected into the scanner 100 indicates events of interest can be determined and this timing information can be used to determine the angular position or positions of scan beams striking the box 106. Provided that scan beams strike the box 106 at a sufficient number of different angles during the time the box 106 is within the field of view of the windows 102 and 104, the angular position information can be used to estimate imaging information relating to the box 106. For example, the size and shape of the box and the approximate position of the box in space can be estimated.

If a bar code is detected on the box 106, the time at which the bar code is detected can also be noted. The position of the bar code may be able to be estimated, as well as the angular position of the scan beam or scan beams striking the bar code. This position information can be used to assist in decoding the bar code, for example, by determining the width of the scan beam at the bar code position and using the beam width information to de-blur the bar code signal. In addition, the imaging information relating to an object such as the box 106 can be used compared with bar code information in order to improve scanning accuracy. For example, if a bar code is not detected, but the box 106 is detected, the scanner 100 can determine that a missed scan has occurred. To take another example, if a double scan occurred, that is, if a bar code on the box 106 was struck by two separate scan lines, each of which indicated detection of a bar code, the fact that only the box 106 was detected will indicate that a double scan occurred and that only one bar code was present.

Figure 2:
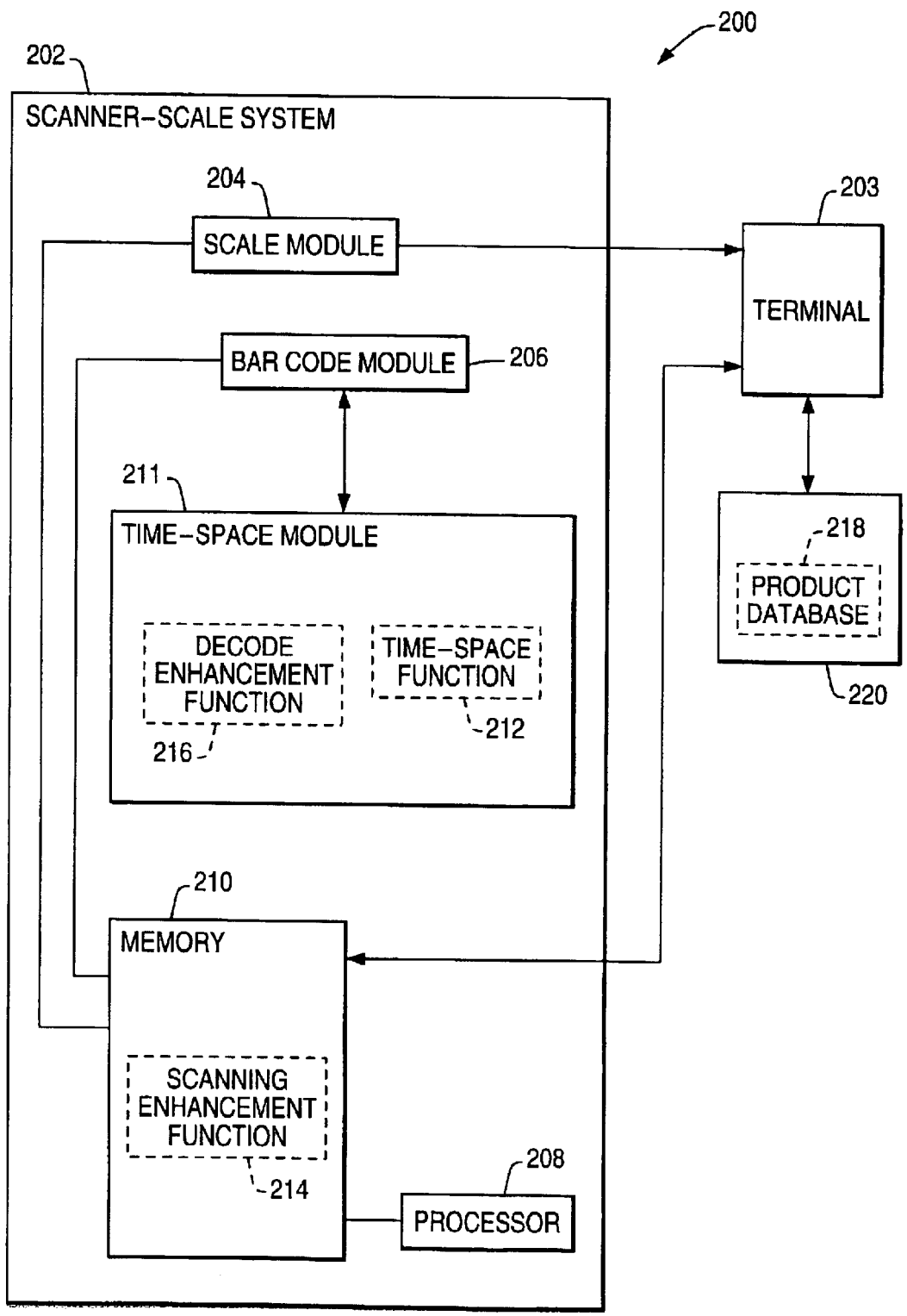
FIG. 2 illustrates functional components of a combination scanner and terminal employing imaging information according to the present invention.

FIG. 2 illustrates a functional diagram of a point of sale system 200 according to the present invention. The point of sale system 200 includes a scanner-scale system 202 and a terminal 203. The scanner-scale system 202 includes a scale module 204, a bar code module 206, a processor 208 and memory 210. The scanner-scale system 202 includes a time-space module 211, used to compute imaging information based on signals provided by the bar code module 206. The time-space module 211 receives a scanner signal produced by reflections of a scan pattern from a bar code, and a time-space function 212 employed by the time-space module 211 produces imaging information, including approximate size and position of the objects producing the reflection, the approximate speed and direction of the objects, shape information relating to the objects and the approximate length of a scan beam striking a detected bar code label.

The time-space module 211 supplies information to a scanning enhancement function 214, used to correlate bar code information received from the bar code module 206 with the imaging information received from the time-space module 211 to determine if missed scans or double scans have occurred and to determine if a detected bar code is consistent with the product that has been presented. The scanning enhancement function 214 is shown here implemented as software residing in the memory 210, from where it is accessed and executed by the processor 208 as needed.

The point of sale system 200 includes or has access to a product database 218, suitably residing on a server 220 accessible to the terminal 203. The product database 218 preferably includes a list of all possible bar codes, with product description information associated with each bar code. The product description information preferably includes product identification information, such as the brand name of the product, product price information and product size, shape and weight information. By querying the product database 218 through the terminal 203, the scanning enhancement function 214 is able to retrieve product size and shape information in order to correlate sizes and shapes of products presented for scanning against expected size and shape information indicated by detected bar codes. As will be discussed in greater detail below, correlating actual and expected size and shape information helps to determine if multiple scans are valid, and presents other advantages in improving scanning accuracy.

In addition to computing imaging information and supplying the information to the scanning enhancement function 214, the time-space module 211 also includes a decoding enhancement function 216 that computes bar code position and scan beam length based on information received from the bar code module 206. The time-space module 211 then supplies the bar code position and beam length information to the bar code module 206 which uses this information to improve its decoding of bar codes. Additional details of the time-space module 211 and the bar code module 206, and the information exchange between them, are shown in FIG. 3 and discussed below.

Figure 3:
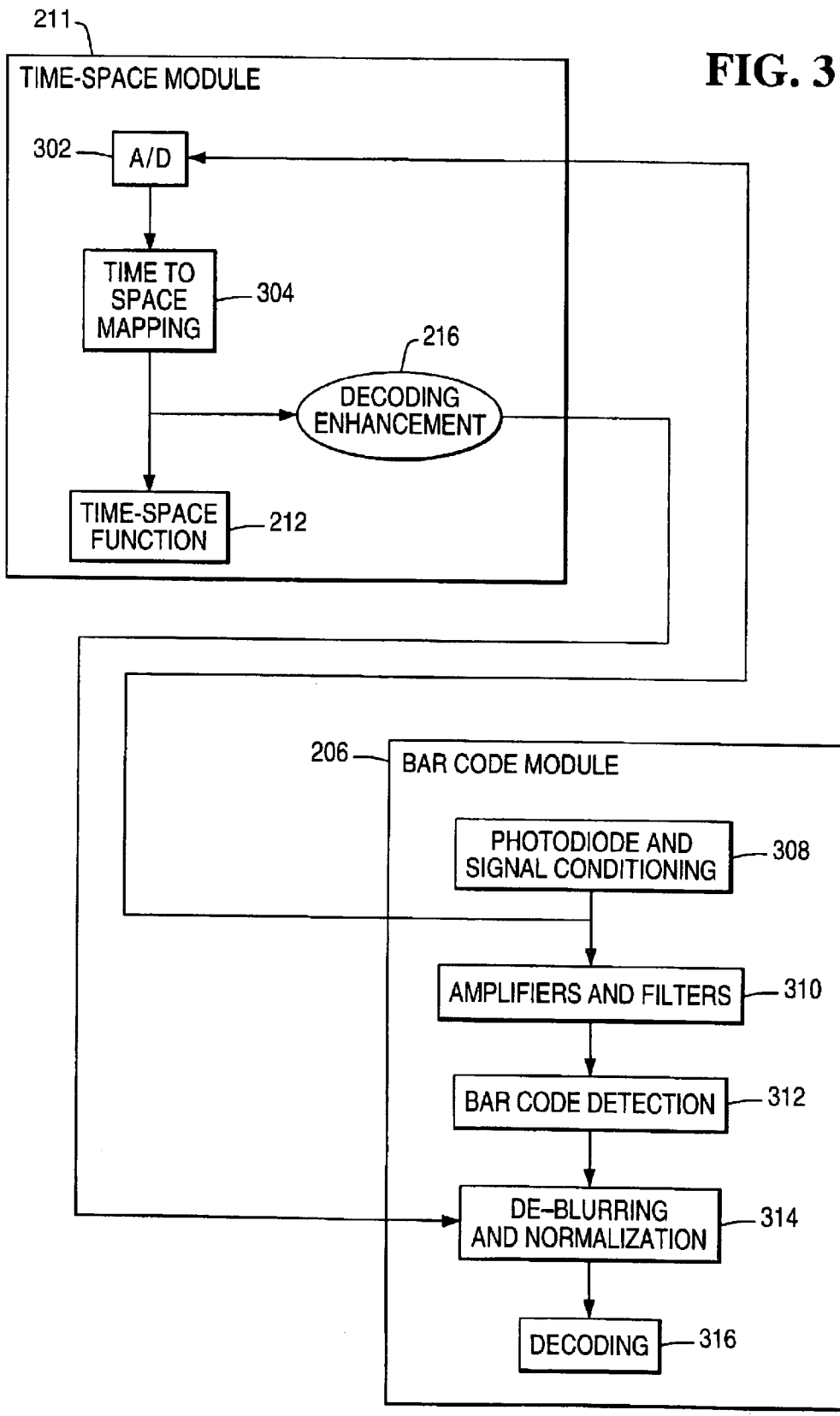
FIG. 3 illustrates selected components of a scanner according to an aspect of the present invention.

FIG. 3 illustrates additional details of the time-space module 211 and the bar code module 206, showing the functioning of each module and the information transfer between the modules. The time-space module 211 includes an analog to digital (A/D) converter 302, a time to space mapping function 304, the decoding enhancement function 216 and the time-space function 212. The bar code module 206 includes a photodiode and signal conditioning circuit 308, an amplifier and filter circuit 310, a bar code detection circuit 312, a de-blurring and normalization function 314 and a decoding function 316. When light enters the scanner 200, for example when a product is scanned, the photodiode and signal conditioning circuit 308 detects the light and produces a scanner signal. The scanner signal is supplied to the A/D converter 302 belonging to the time-space module 211. The scanner signal includes DC and low frequency components and can be analyzed and processed as described herein to compute imaging information. The A/D converter 302 converts the scanner signal to a digital signal and supplies it to the time-space mapping function 304, which notes the time at which events of interest occur, converts the timing information to space information and transfers the space information to the time-space function 212, which uses the space information to compute imaging information.

The scanner signal is also provided to the amplifier and filter circuit 310 belonging to the bar code module 206. The amplifier and filter circuit 310 filters out low frequency components of the scanner signal to generate a bar code signal comprising the high frequency components generated by the scan line's crossing of the regular bars and spaces of a typical bar code. The bar code detection circuit 312 receives the bar code signal and detects a bar code whenever the bar code signal indicates the presence of a bar code. Whenever a bar code is detected, the bar code detection circuit 312 alerts the time to space mapping function 304, and sends the bar code signal to the de-blurring and normalization function 314 and the decoding function 316. The time to space mapping function 304 notes the time at which a bar code is detected and maps this timing information to space information. The space information is supplied to the decoding enhancement function 306, which computes the bar code position and scan beam length and supplies this information to the de-blurring and normalization function 314 belonging to the bar code module 206. The de-blurring and normalization function 314 computes the width of the scan beam, as well as the position of the scan beam along a scan line. The width of the scan beam can be computed given known properties of the beam and the length of the beam, that is, the distance traveled by the beam before it is reflected from the bar code. The position of the beam along the scan line is easily computed from the angular position of the scan beam, which may in turn be easily computed from the time at which reflection of the beam is detected.

The width of the scan beam provides a quantitative description of the optical blurring effect of to which the scan beam is subject. The knowledge of this optical blurring effect provided by the knowledge of the width of the scan beam allows the de-blurring and normalization function to compute de-blurring information that will improve the ability of the decoder 316 to decode the bar code.

Knowledge of the position of the beam along the scan line traced out by the scan beam allows the de-blurring and normalization function 314 to compensate for variations in optical collection efficiency that cause variations in the strength of the bar code signal depending on the position of the scan beam along the scan line. Efficiency variations along a scan line are significant and are especially pronounced near the two ends of the scan lines. The knowledge of the position of the scan beam provided by the time-space module 212 allows for compensation for such efficiency variations. For example, compensation can be accomplished for a particular scan line by taking into account a known efficiency curve of the scan line.

The de-blurring and normalization function 314 supplies the de-blurring and normalization information to the decoding function 316, which uses it to improve the accuracy of decoding of the bar code. The accuracy allowed by de-blurring and normalization may be quite significant in decoding difficult bar codes, for example, relatively low contrast bar codes printed directly on irregular surfaces, as is often the case with bar codes printed on egg cartons.

Figure 4:
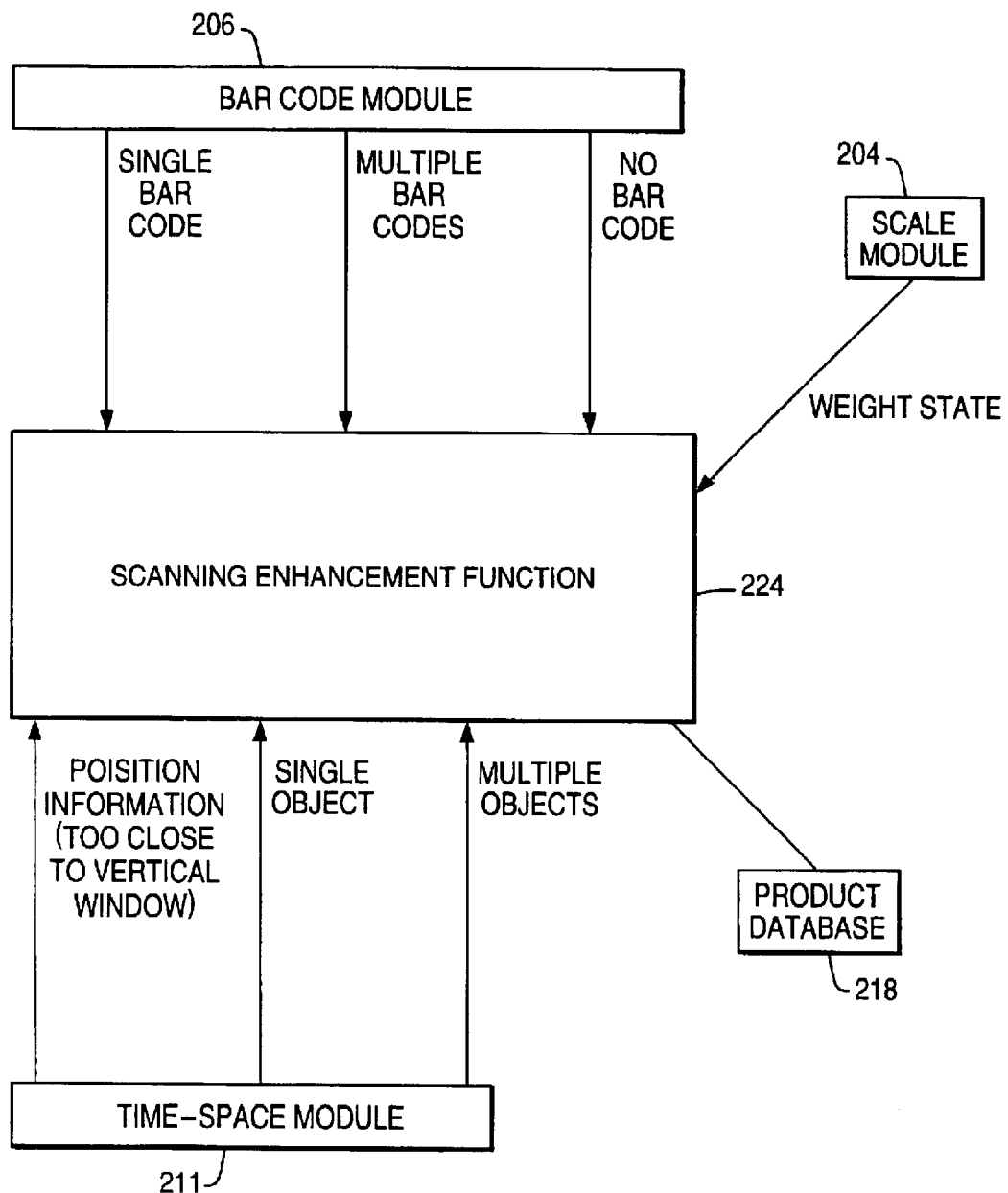
FIG. 4 illustrates details of the use of imaging information to improve the accuracy of bar code decoding and transactions according to an aspect of the present invention.

FIG. 4 is a functional diagram illustrating the operation and information flow of the scanning enhancement function 214. The scanning enhancement function 214 receives bar code data from the bar code module 206. The bar code data includes the fact that bar codes are detected and the number of bar codes detected, as well as bar code information obtained by decoding each bar code. The scanning enhancement function 214 also receives imaging data from the time-space module 211. The imaging data may include the number of objects detected as well as size and shape information for the detected objects. The imaging data may also include position and motion data which can be used to improve bar code decoding as noted above. The position and motion data can also be used to determine if an object is in a proper position to be scanned. In particular, an object being weighed on a scanner-scale combination having a vertical window will be inaccurately weighed if the object is in contact with the vertical window during weighing. Therefore, the scale module 204 indicates to the scanning enhancement function 204 if the scale module 204 is in a weight state. The scanning enhancement function 214 then uses position information to provided by the time-space module 211 to determine if the object being weighed is at least a predetermined distance away from the vertical window. If the object is too close to the vertical window, the scan is rejected and an error message is displayed, directing the operator to move the object to a position further from the vertical window.

The possibilities of bar code detection presented by the bar code data include detection of a single bar code, detection of multiple bar codes and detection of no bar code. The possibilities for the number of detected objects include detection of a single object or detection of multiple objects. The scanning enhancement function 214 compares the number of bar codes detected against the number of objects detected to determine whether or not scans are valid and to provide suitable instructions or error messages for an operator.

Comparing the number of objects detected against the number of bar codes detected allows the scanning enhancement function 214 to identify double scans or missed scans.

A number of different possibilities may be presented in scanning of objects, and the comparison of imaging information and bar code information can be used to identify and deal with each of these possibilities. If a single bar code is detected and a single object is detected, a successful scan has occurred and the bar code information may be sent to a terminal, such as the terminal 203. In order to provide greater security, expected size and shape information for the product associated with the bar code may be retrieved from the product database 218, and this expected size and shape information may be compared against the actual size and shape information for the object presented. If the size and shape information of the object presented does not match the expected size and shape information, a valid scan has not occurred, and a suitable error message may be prepared, notifying an operator that a mismatch occurred between the actual object presented and the object associated with the bar code that was scanned. Such a comparison between actual and expected size and shape information can help to deter or detect fraudulent substitution of a bar code label for a lower priced product for a bar code label on a higher priced product presented in the transaction. This comparison between expected and actual size and shape information may be performed for every object that is scanned. In addition, as will be seen below, comparison of expected and actual size and shape information may help to detect or correct errors resulting from missed or double scans.

If a single object is detected or multiple objects are detected, but no bar code is detected, a scan failure has occurred. A suitable message may be sent to an operator directing the operator to rescan the object or objects.

If multiple bar codes are detected but a single object is detected, this indicates that a double scan has occurred. Bar code information for a single bar code is sent to a terminal. If no bar code is detected and a single object or multiple objects are detected, a scan failure has occurred and an error message may be sent to notify an operator that the scan failed and a new attempt should be made.

If a single bar code is detected, but multiple objects are detected, a scan failure has occurred for at least one object. The scanning enhancement function 214 attempts to associate the bar code that was detected with one of the objects that was detected by matching actual size and shape data to the size and shape data associated with the object identified by the bar code. If the actual size and shape data for one and only one of the objects matches the size and shape data for the object identified by the bar code, an error message can be sent to the operator identifying the object that was successfully scanned and directing the operator to rescan the remaining objects. The bar code data for the successfully scanned object is transferred to the terminal 203.

If multiple bar codes are detected but a single object is detected, a double scan has probably occurred. In most cases in which double scans occur, two identical bar codes are detected due to reflection of two scan lines from the same bar code. In such a case, a single object will be detected while two identical bar codes are detected. In the event of such an occurrence, the scanning enhancement function may insure that only one scan will be declared to be valid and only one bar code will be sent to the terminal 203. If an additional safeguard is desired, the scanning enhancement function 214 can retrieve expected size and shape information from the database 218 and compare the expected size and shape information against the actual size and shape of the detected object. If the actual size and shape information matches the expected size and shape information, the scanning enhancement function 214 concludes that a double scan of the detected object occurred, and sends only a single bar code to the terminal 203.

If multiple bar codes are detected and multiple objects are detected, and the number of bar codes matches the number of objects, each object may have been properly scanned or a combination of errors may have occurred. Possible error combinations include a missed scan for one object and a double scan for another object. In order to improve the confidence in the scan, size and shape data for each object is examined and compared to the size and shape data for the objects associated with the detected bar codes. The objects and bar codes will have been detected in a sequence and the sequence of objects is suitably compared to the expected sequence of objects expected from the bar code information. For example, a large rectangular object may be detected, followed by a small cylindrical object. The objects identified by the sequence of bar codes detected may be a large box of detergent and a regular size can of soup. In this case, the sizes and shapes of the objects detected match the sizes and shapes of the objects indicated by the bar codes, so the scans are validated and transferred to a terminal for entry into the transaction.

If the sequence of bar codes does not properly identify the objects that have been detected, a comparison is made to determine if any objects have been properly scanned. For example, if two small cylindrical objects are detected, followed by a large rectangular object, and the bar codes detected identify a can of chicken soup and two cans of vegetable soup, it is very likely that the can of chicken soup was scanned correctly, one can of vegetable soup was double scanned and the large rectangular object failed to scan. In this case, the operator can be informed that a can of chicken soup and a can of vegetable soup appear to have scanned correctly, but a large rectangular object was detected that failed to scan properly.

If multiple objects are detected, but the number of bar codes detected is greater or less than the number of objects detected, comparison of the expected size and shape information against the actual size and shape information can be performed in order to identify which objects were scanned correctly and which objects were missed or double scanned. The sizes and shapes of the objects detected are compared to the expected sizes and shapes of the objects identified by the detected bar codes, and deviations are noted, provided that the deviations are relatively small in number and can be decisively identified. In such a case, the bar code information for the correctly scanned objects is sent to a terminal, the correctly scanned items are identified for the operator and the operator is directed to rescan the items which failed to scan. If a large number of deviations occurred or if the deviations cannot be identified, none of the items is identified as having been scanned correctly and the operator is directed to rescan the items.

Figure 5:
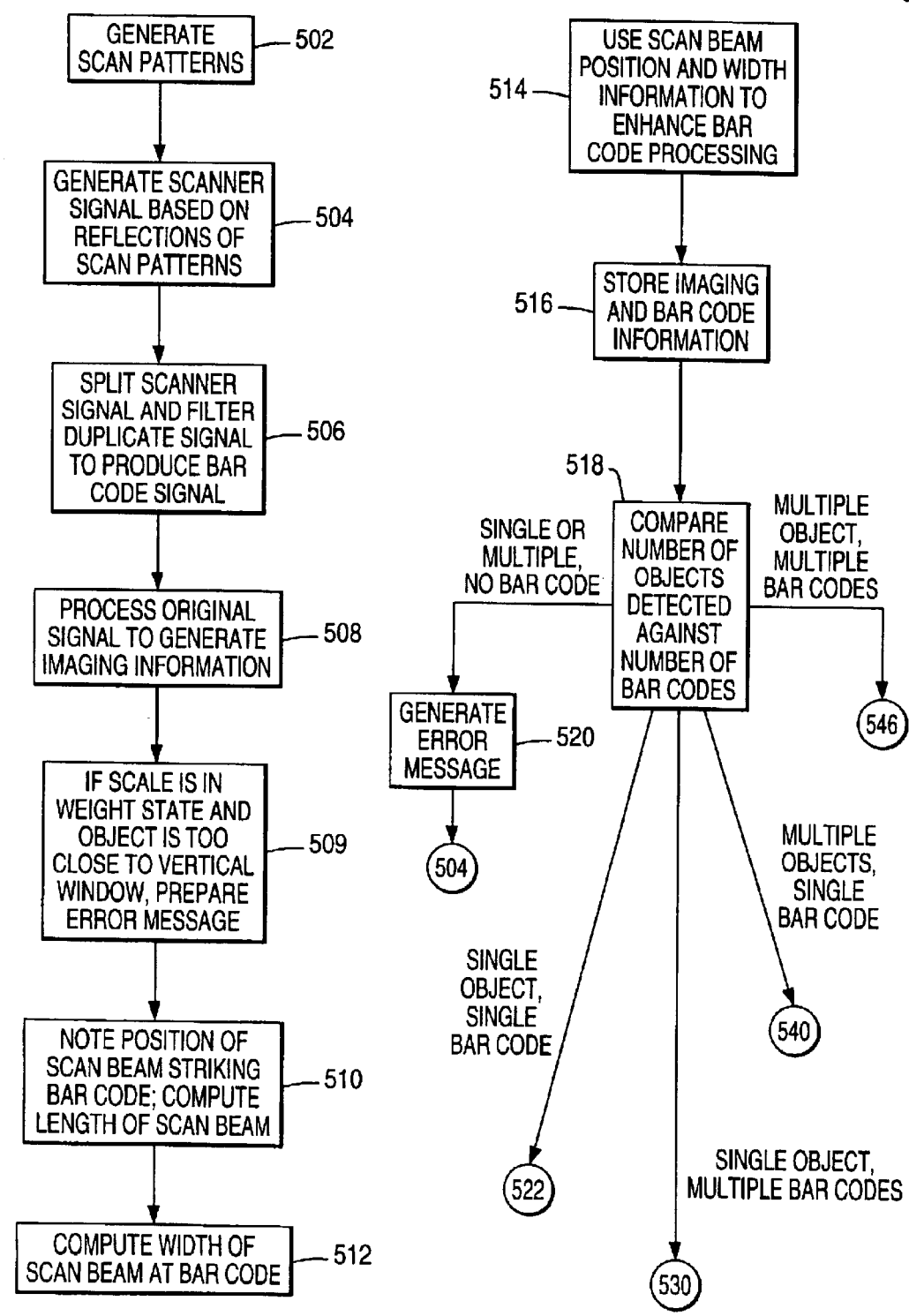
FIG. 5 illustrates a process of product scanning and bar code decoding employing imaging information according to an aspect of the present invention.
Figure 5:
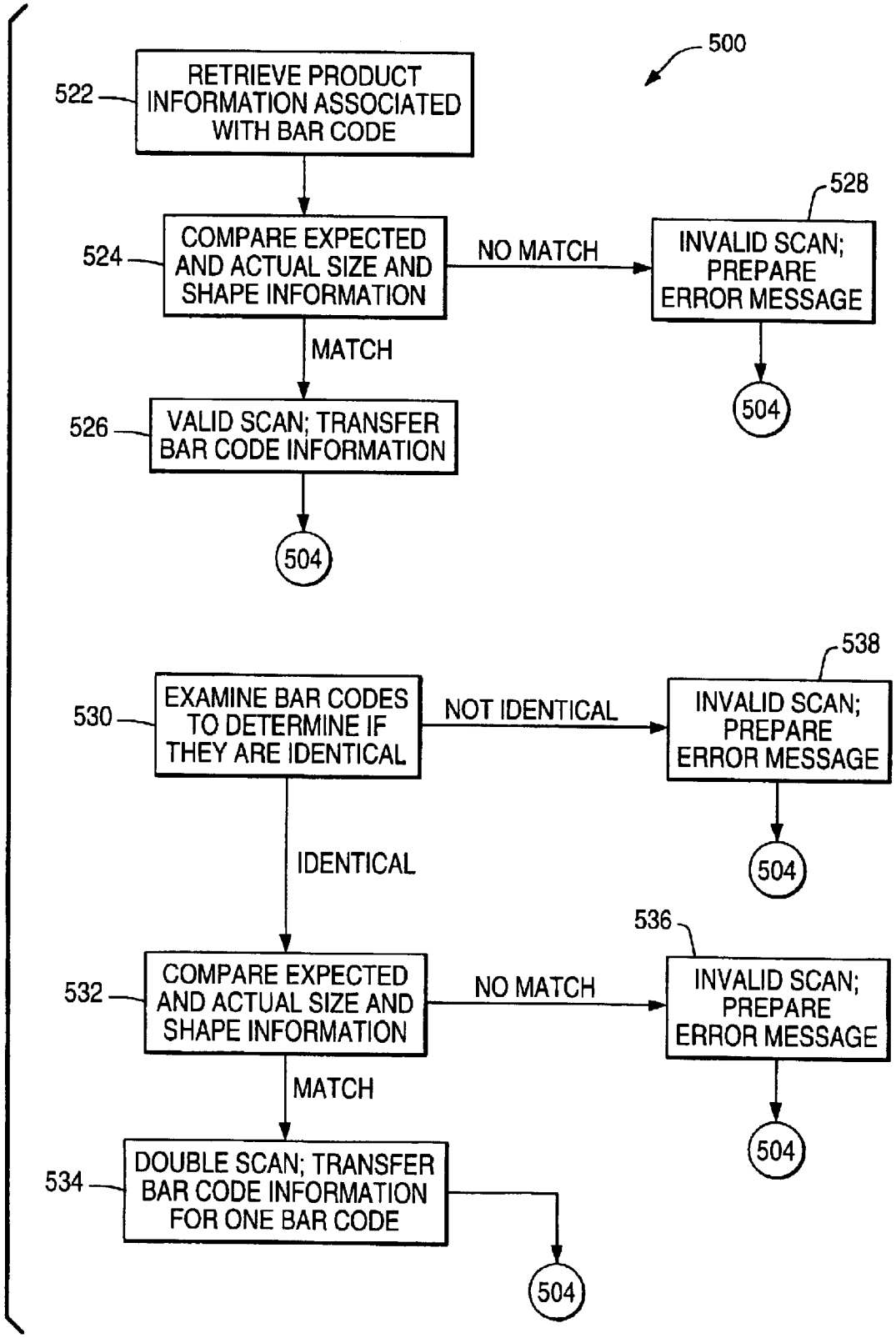
Figure 5:
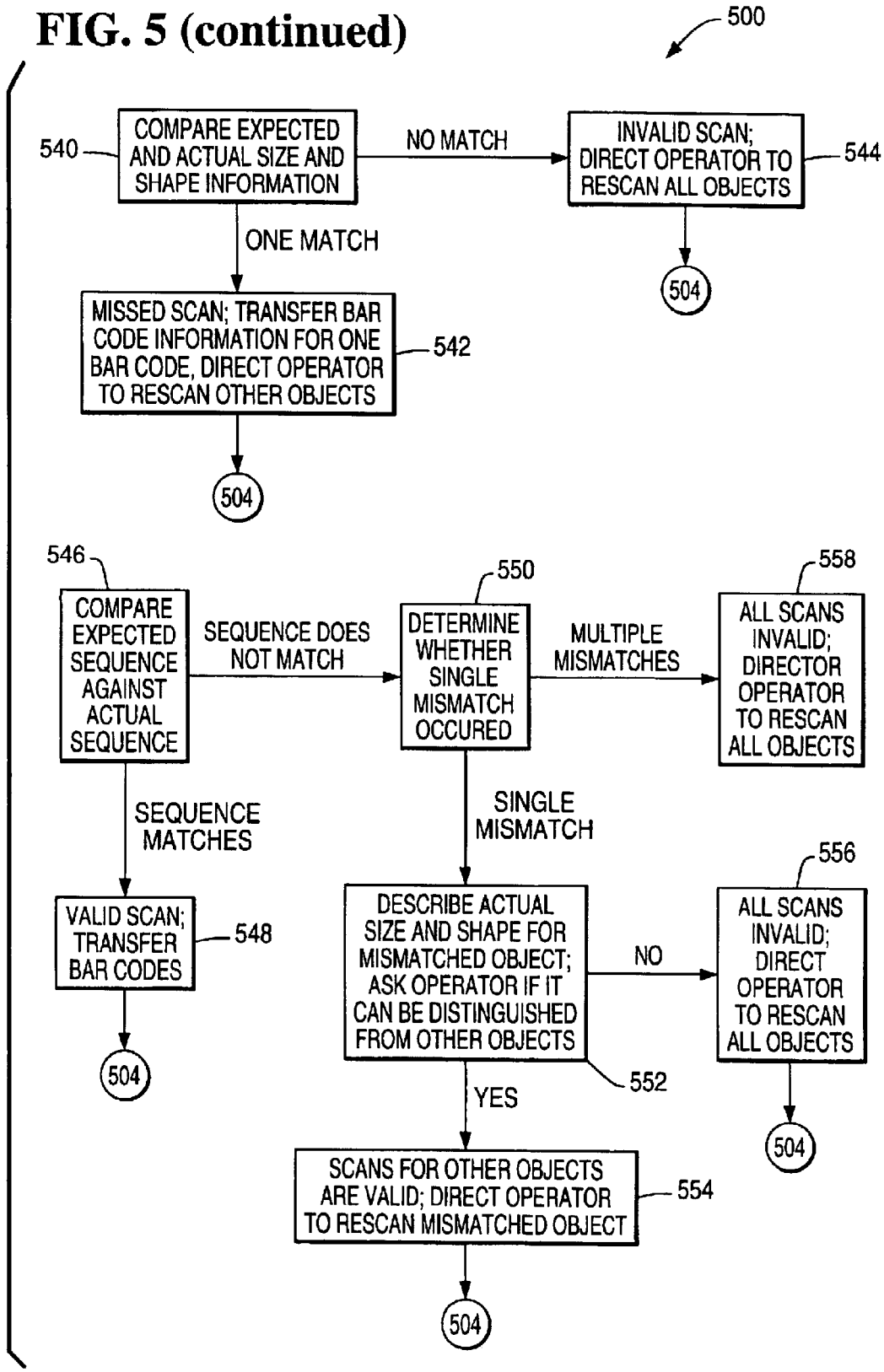

FIG. 5 illustrates a process 500 of product scanning using imaging information for improvement of scanning and decoding accuracy according to the present invention. At step 502, one or more scan patterns are generated, each scan pattern emerging from a scan window and comprising a plurality of scan lines traced out by a moving scan beam. At step 504, upon presentation of one or more objects within the field of view of the scan window or windows, the detection of reflected light from the objects, a scanner signal is generated based on the reflected light. At step 506, the scanner signal is split into an original scanner signal and a duplicate scanner signal, and the duplicate scanner signal is filtered to remove low frequency components in order to generate a bar code signal. At step 508, the original scanner signal is processed to generate imaging information describing characteristics of the objects generating the reflections. The imaging information preferably includes size, shape, position and motion information for each object.

At step 509, information from a scale module is examined to determine if the scale is in a weight state. In other words, an indication, such as an operator selection or command, has been given indicating that an object is to be weighed. This indication is typically accompanied or closely followed by placement of an object on the scale so that its weight is detected. If the scale is in a weight state, the position information for each object is examined to determine if the object is in a position such that an inaccurate weight may be detected for the object. This may result, for example, from a case in which the object is too close to a vertical scanner window. In such an instance, the object may be touching the vertical scanner window so that the vertical scanner window bears some of the weight of the object. To take another example, the object may be positioned so that it is partially off of the scale. If the object is in a position interfering with accurate weighing, an error message is prepared notifying an operator that an object is improperly positioned for weighing and directing the operator to reposition the object. The process then returns to step 504. If the object is not in a weight state, or if no object is too close to the vertical window, the process proceeds to step 510.

At step 510, for each bar code indicated by the bar code signal, the position of the scan beam striking the bar code is noted and the length of the scan beam is computed. At step 512, the width of the scan beam at the bar code is computed. At step 514, the scan beam position and width information are used to enhance processing of the bar code signal in order to decode the bar code to extract bar code information. At step 516, the imaging information for each object and bar code information for each bar code within the field of view of the scanner window are temporarily stored.

At step 518, the number of objects detected is compared against the number of bar codes detected in order to determine if accurate scanning has occurred. If a single object or multiple objects were detected and no bar code was detected, the process proceeds to step 520 and an error message is generated directing an operator to rescan the object. The process then returns to step 504. Returning now to step 518, if a single object was detected and a single bar code was detected, the process proceeds to step 522 and product information associated with the bar code is retrieved. At step 524, expected size and shape information for the product indicated by the bar code is compared against the actual size and shape information. If the expected size and shape information matches the actual size and shape information, the process proceeds to step 526, the scan is declared to be valid and the bar code information is transferred to a terminal for entry in a transaction. The process then returns to step 504. If the expected size and shape information does not match the actual size and shape information, the process proceeds to step 528, the scan is declared to be invalid and an error message is generated notifying the operator that the scan is invalid and directing the operator to repeat the scan. The process then returns to step 504.

Returning now to step 518, if a single object is detected but multiple bar codes are detected, the process proceeds to step 530 and the bar codes are examined to determine if they are identical. If the bar codes are identical, the process proceeds to step 532 and the expected size and shape information is compared to the actual size and shape information. If the expected size and shape information matches the actual size and shape information, the process proceeds to step 534, the scan is declared to be a double scan and the bar code information for a single occurrence of the bar code is transferred to the terminal. The process then returns to step 504. If the expected size and shape information does not match the actual size and shape information, the process proceeds to step 536, the scan is declared to be invalid and an error message is prepared directing the operator to rescan the product. The process then returns to step 504.

Returning now to step 530, if the bar codes are not identical, the process proceeds to step 538, the scan is declared to be invalid and an error message is prepared directing the operator to rescan the product. The process then returns to step 504.

Returning now to step 518, if multiple objects were detected and a single bar code is detected, the likelihood is that a missed scan occurred for one of the objects. The process proceeds to step 540 and the actual size and shape information for the objects is compared against expected size and shape information associated with the detected bar code. If the size and shape information for one of the objects matches the expected size and shape information, the process proceeds to step 542 and an error message is provided to the operator, telling the operator which object was scanned successfully and directing the operator to rescan the other object. The process proceeds to step 504. Returning now to step 540, if the expected size and shape information does not match the size and shape information for any of the objects presented, the process proceeds to step 544 and the operator is informed that none of the products matches the detected bar code, and is directed to rescan all objects. The process then returns to step 504.

Returning now to step 518, if multiple objects and multiple bar codes are detected, the process proceeds to step 546, and the sequence of objects presented is compared against the sequence of objects expected. That is, the actual sizes and shapes of the objects are compared, in the order of presentation of the objects, against the expected sizes and shapes of the objects associated with the detected bar codes, in the order of presentation of the bar codes. If the actual sizes and shapes of the objects presented match the expected sizes and shapes of the objects associated with the detected bar codes, the process proceeds to step 548, the scan is declared to be valid and the bar code information is transferred to a terminal for entry into a transaction. The process then returns to step 504.

Returning now to step 546, if the actual sizes and shapes of the objects do not match the expected sizes and shapes, the process proceeds to step 550 and the size and shape information is examined to determine if a single mismatch occurred. If a single mismatch occurred, the process proceeds to step 552 and the operator is informed of the size and shape of the object that did not match the expected size and shape information and asked if the object can be distinguished from the other objects. If the operator answers in the affirmative, the process proceeds to step 554, the operator is directed to scan the object for which the mismatch occurred, the scans for the other objects are declared to be valid and the bar code information for the objects for which the actual size and shape information matched the expected size and shape information is transferred to a terminal for entry into a transaction. The process then returns to step 504. If the operator answers in the negative, the process proceeds to step 556, the scan is declared to be invalid and the operator is directed to rescan the objects. The process then returns to step 504.

Returning now to step 552, if a single mismatch did not occur, that is, if multiple mismatches occurred, the process proceeds to step 558, the scan is declared to be invalid and an error message is prepared directing the operator to rescan all objects. The process then returns to step 504.

While the present invention is disclosed in the context of a presently preferred embodiment, it will be recognized that a wide variety of implementations may be employed by persons of ordinary skill in the art consistent with the above discussion and the claims which follow below.

We claim:

1. A bar code scanner for use in a point of sale system including a terminal, the bar code scanner comprising:
   a scan window;
   a laser source for producing a scan beam emerging from the scan window and striking an object within range of the scan window to produce reflections from the scan beam off of the object, a portion of the reflections comprising light reentering the scan window;
   collection optics for collecting the light reentering the scan window;
   a photodetector for producing a scanner signal based on the light collected by the collection optics;
   a time-space module for processing the scanner signal to estimate imaging information relating to the object producing the reflections, including a decoding enhancement function for computing beam position and beam length information for a scan beam striking a bar code;
   a bar code module for processing the scanner signal to obtain bar code information, wherein the bar code module employs the beam position and beam length information to improve decoding accuracy; and a processor for controlling transfer of the bar code information to the terminal, the processor executing a scanning enhancement function for receiving the imaging information and the bar code information and comparing expected object information associated with the bar code information and actual object information given by the imaging information to evaluate whether or not a valid scan occurred, the scanning enhancement function being operative to transfer the bar code information to the terminal if a valid scan occurred, the scanning enhancement function being operative to prepare an error message for display by the terminal if an invalid scan occurred.

2. The bar code scanner of claim 1, wherein the bar code module uses the beam length information to compute the width of the scan beam at the bar code position and uses the beam width to de-blur the bar code signal.

3. The bar code scanner of claim 2, wherein the bar code module uses the beam position information to normalize the bar code signal to compensate for variations in light collection efficiency caused by the position of the scan beam.

4. The bar code scanner of claim 3 wherein the scanning enhancement function is operative to compare a number of bar codes detected against a number of objects detected and determine that a valid scan did not occur if the number of bar codes detected does not match the number of objects detected.

5. The bar code scanner of claim 4, further comprising a product database and wherein the scanning enhancement function is operative to retrieve from the product database expected size and shape information for an object associated with a detected bar code and to compare the expected size and shape information against actual size and shape information in order to determine whether a valid scan occurred.

6. The bar code scanner of claim 5, wherein the scanning enhancement function determines that a valid scan occurred if the number of bar codes detected is equal to the number of objects detected and the expected size and shape information for each object matches actual size and shape information for each object.

7. The bar code scanner of claim 6, wherein the scanning enhancement function prepares an error message directing an operator to repeat a scan if an object is detected but no bar code is detected.

8. The bar code scanner of claim 7, wherein the scanning enhancement function identifies a scan as a possible double scan if a single object is detected but two identical bar codes are detected, and wherein the scanning enhancement function compares the size and shape information for the detected object against expected size and shape information associated with the bar code information, identifies the scan as a double scan if the expected size and shape information matches the actual size and shape information and transfers to a terminal bar code information for a single occurrence of the bar code.

9. The bar code scanner of claim 8, wherein the scanning enhancement function identifies a scan as a missed scan if a single bar code is detected but multiple objects are detected, examines actual and expected size and shape information to identify which objects were correctly scanned and prepares an error message identifying the successfully scanned objects and to rescan the missed object if the correctly scanned objects can be identified from the actual and expected size and shape information.

10. The bar code scanner of claim 9, wherein the scanning enhancement function is operative to retrieve expected size and shape information in when multiple objects and multiple bar codes are detected and wherein the scanning enhancement function is operative to identify a scan as valid if the number of bar codes detected matches the number of objects detected and the expected sequence of size and shape information matches the actual sequence of size and shape information of objects passing within the field of view of the scanner.

11. The bar code scanner of claim 10, wherein the scanner comprises a horizontal scan window and a vertical scan window and wherein the scanning enhancement function is operative to receive weight state information indicating whether or not a scale module connected to the scanner is in a weight state, the scanning enhancement function being operative to identify a scan as invalid if an object within the field of view of the scanner is less than a predetermined distance from the vertical scan window when the scale module is in a weight state.

12. A method of point of sale processing, comprising the steps of:

passing one or more objects within a field of view of a scanner;

computing imaging information using information obtained from a scanner signal based on collected light reflected from the objects into the scanner;

detecting and decoding bar codes passing within the field of view of the scanner in order to obtain bar code information including using imaging information to improve decoding accuracy; and comparing the imaging information with the bar code information in order to improve scanning accuracy including comparing the number of bar codes detected against the number of objects detected and identifying a scan as invalid if the number of bar codes detected fails to match the number of objects detected;

retrieving expected size and shape information and comparing the expected size and shape information of objects associated with detected bar codes against actual size and shape information of objects within the field of view of the scanner to determine if the expected size and shape information matches the actual size and shape information; and identifying a scan as valid if a single object and a single bar code are detected and the expected size and shape information for the object associated with the bar code matches the actual size and of the object within the field of view of the scanner.

13. The method of claim 12, wherein the step of comparing the imaging information with the bar code information includes identifying a scan as a double scan and transferring to a terminal bar code information for a single occurrence of the detected bar code if a single object and multiple identical bar codes are detected and the expected size and shape information for the object associated with the bar code matches the actual size and shape of the detected object.

14. The method of claim 13, wherein the step of comparing the imaging information with the bar code information includes identifying a scan as valid if multiple bar codes and multiple objects are detected, the number of bar codes detected matches the number of bar codes detected and the sizes and shapes of the sequence of objects detected matches expected size and shape information for objects associated with the bar codes detected.

* * * * *